(12) United States Patent
Brown

(10) Patent No.: US 10,064,343 B2
(45) Date of Patent: Sep. 4, 2018

(54) SUBMERSIBLE FOLIAGE PLANTER AND METHOD OF USING SAME

(71) Applicant: Mark V. Brown, Brunswick, OH (US)

(72) Inventor: Mark V. Brown, Brunswick, OH (US)

(*) Notice: Subject to any disclaimer, the term of this patent is extended or adjusted under 35 U.S.C. 154(b) by 75 days.

(21) Appl. No.: 14/823,695

(22) Filed: Aug. 11, 2015

(65) Prior Publication Data

US 2016/0037732 A1    Feb. 11, 2016

Related U.S. Application Data

(60) Provisional application No. 62/035,583, filed on Aug. 11, 2014.

(51) Int. Cl.
*A01G 24/50* (2018.01)
*A01G 9/02* (2018.01)

(52) U.S. Cl.
CPC .............. *A01G 9/02* (2013.01); *A01G 9/026* (2013.01); *A01G 24/50* (2018.02)

(58) Field of Classification Search
CPC .............. A01K 63/02; A01G 13/0256; A01G 13/0262; A01G 13/0268; A01G 13/0281; E02B 3/123; E02B 3/125; E02B 3/12
See application file for complete search history.

(56) References Cited

U.S. PATENT DOCUMENTS

| 3,562,952 | A | | 2/1971 | Bramante | |
|---|---|---|---|---|---|
| 3,733,745 | A | * | 5/1973 | Ingerstedt | A01G 9/02 47/56 |
| 4,369,599 | A | * | 1/1983 | Franclet | A01G 9/104 47/74 |
| 6,067,752 | A | * | 5/2000 | Bryan | A01G 13/10 47/47 |
| 6,195,935 | B1 | * | 3/2001 | Bellucci | A01G 13/0281 47/9 |
| 7,703,239 | B2 | * | 4/2010 | Steele | A01G 9/022 47/65.8 |
| 8,448,279 | B2 | * | 5/2013 | Cook | E01D 19/125 14/26 |
| 9,297,134 | B1 | * | 3/2016 | Dancer | E02B 3/12 |
| 2005/0161407 | A1 | * | 7/2005 | McPhillips | A01N 25/08 210/747.3 |
| 2008/0138157 | A1 | * | 6/2008 | Kim | E02D 29/0291 405/107 |
| 2009/0307972 | A1 | * | 12/2009 | Ottevanger | A01G 24/00 47/59 S |

* cited by examiner

*Primary Examiner* — Jessica B Wong
(74) *Attorney, Agent, or Firm* — Carrier Blackman & Associates, P.C.; Joseph P. Carrier; William D. Blackman

(57) ABSTRACT

A submersible foliage planter includes a growing medium; and a container including an inner pouch of fine porous material which encloses the growing medium therein and an outer pouch of course porous material which encloses the inner pouch therein, wherein the coarse porous material has an average pore size larger than that of the fine porous material, the fine porous material and course porous material are permeable by water and by a root system of an aquatic plant, and the course porous material is water insoluble.

10 Claims, 3 Drawing Sheets

SUBMERSIBLE FOLIAGE PLANTER AND METHOD OF USING SAME

CROSS REFERENCE TO RELATED APPLICATIONS

The present application is a continuation-in-part of, and claims priority under 35 USC 119 based on U.S. provisional patent application Ser. No. 62/035,583, file 11 Aug. 2014. The entire disclosures these prior application is incorporated herein by reference.

BACKGROUND OF THE INVENTION

Field of the Invention

The present invention relates to a relatively simple device plants to be easily and stably grown in an aquarium or aquatic tank, while minimizing any adverse effects on the clarity, pH, and other characteristics of the water system in the aquarium.

Description of the Background Art

There are many known devices for facilitating growth of plants in an aquarium. These include: devices which stably anchor plants at various underwater locations, such as the plant anchor disclosed in U.S. Pat. No. 3,562,952 to Bramante; simple containers which contain a growing medium, can be submerged in an aquarium, and have opening(s) in portion(s) thereof, such as an open top, which permit the root system of a plant to be situated in the growing medium; devices formed of a synthetic material which does not dissolve in water, such as a foam, which incorporates a growing medium therein, and which may be secured at a submerged location in an aquarium using weights or other securing means, and which can support a root system of a plant; etc.

While the known devices are suitable for their intended functions, they still remain to be improved upon. For example, the plant anchor in U.S. Pat. No. 3,562,952 can be somewhat involved and large, and it is still necessary to provide some type of growing medium for the plants secured by the anchor. Simple submersible containers with growing medium are disadvantageous because the growing medium tends to escape from the containers and affect the clarity and pH of the water in the aquarium. Submersible devices formed of synthetic materials can be somewhat complicated, and plants grown therein do not always thrive.

It is also conventional practice to add soil to a portion or the entire bottom of an aquarium, then secure the root systems of plant(s) in the soil, cover the soil and root systems with a medium such as sand or gravel, and then fill the aquarium with water. While this method is effective for growing the plants, it is necessary to wait for the water to clear and adjust the pH of the water before adding fish.

SUMMARY OF THE INVENTION

It is an object of the invention to provide a submersible foliage planter which addresses and overcomes the disadvantages of the known submersible aquarium plant growing devices, and a method of using same.

According to one aspect of the present invention, there is provided a submersible foliage planter comprising: a growing medium; and a container including an inner pouch of fine porous material which encloses the growing medium therein and an outer pouch of course porous material which encloses the inner pouch therein, wherein the coarse porous material has an average pore size larger than that of the fine porous material, the fine porous material and course porous material are water-permeable, and the course porous material is water insoluble.

The growing medium may comprise an organic growing medium such as potting soil, and may have an average particle size larger than a pore size of the fine porous material.

The container having the growing medium enclosed therein may be substantially flat with a thickness in a range of 0.5-5.0 centimeters.

According to another aspect of the present invention, there is provided a method for growing plants in a water-filled aquarium which comprises the steps of: providing a submersible foliage planter including a growing medium, and a container having an inner pouch of fine porous material which encloses the growing medium therein and an outer pouch of course porous material which encloses the inner pouch therein, wherein the fine porous material and course porous material are permeable by water and by a root system of an aquatic plant, and the course porous material is resistant to degradation by water; placing the planter at a desired location within an aquarium; placing a plant with a root system onto the planter such that the plant's root system engages a surface of the planter; and securing the plant in engagement with the planter by placing a quantity of medium such as sand and/or gravel over the plant's root system and the planter, the quantity of being sufficient to cover the planter and maintain the plant in a desired orientation relative to the planter.

Again, the growing medium may comprise an organic growing medium such as potting soil, and may have an average particle size larger than a pore size of the fine porous material, and the container having the growing medium enclosed therein may be substantially flat with a thickness in a range of 0.5-5.0 centimeters.

With the submersible foliage planter and method of use according to the invention the growing medium is well contained within the container including the inner and outer pouches such that it will not leak into the aquarium water to any significant extent over a long time, e.g., one year or more, and thereby will not detrimentally affect the appearance (cloudiness), pH, or other characteristics of the water in the aquarium over such an extended time period. However, due to the porous nature of the materials used in forming the inner and outer pouches, a root system of an aquatic plant will readily grow through the pouches and into the growing medium contained therein so that the plant may derive nutrients from the growing medium which permit the plant to thrive.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found. There has been chosen a specific exemplary embodiment of a submersible foliage planter according to the invention and specific alternative structures and modifications thereto, the embodiment having been chosen for the purposes of illustration and description of the structure and method of the invention are shown in the accompanying drawings forming a part of the specification.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF PRESENTLY CONTEMPLATED EMBODIMENT

Figure 1:
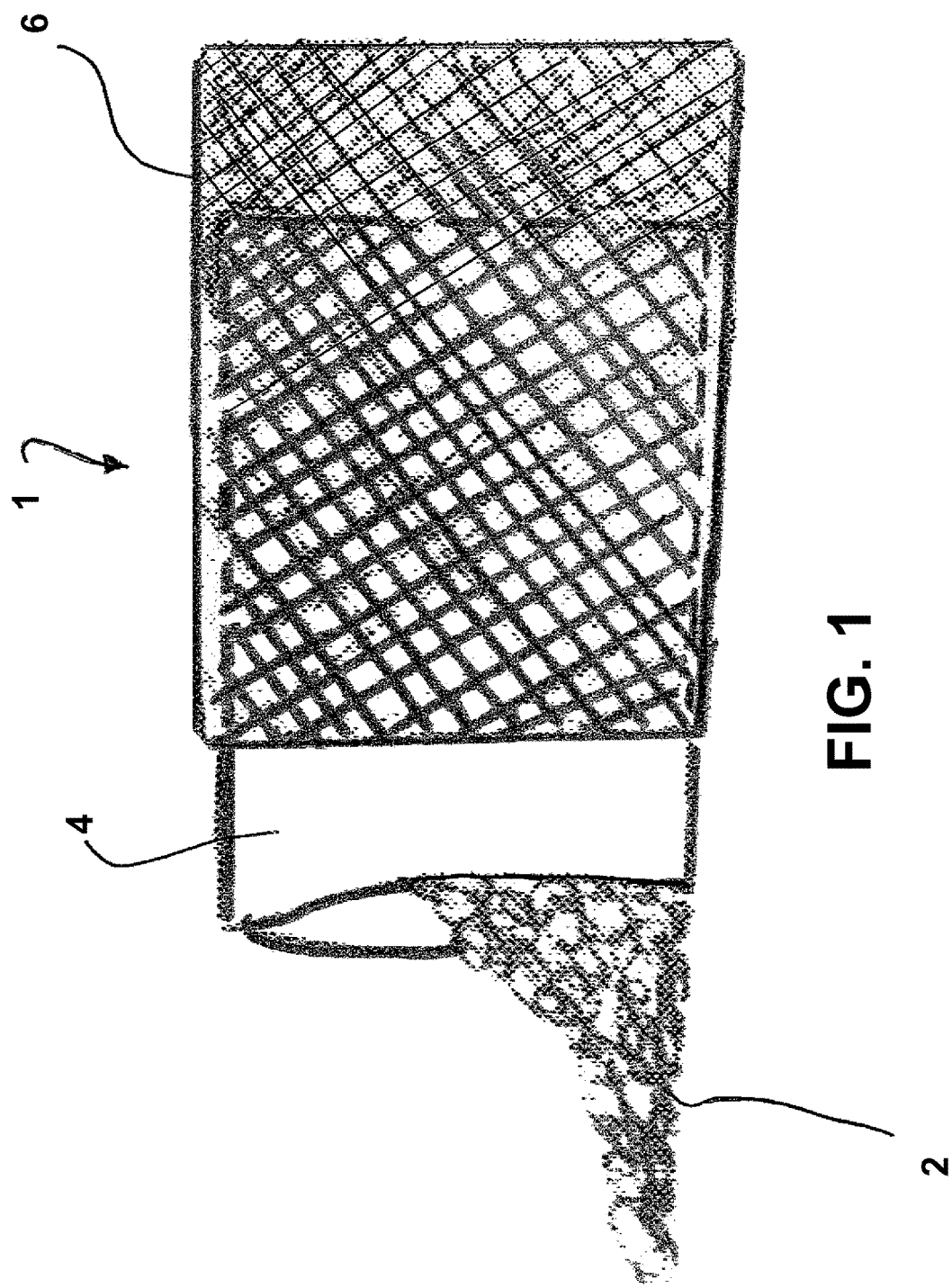
FIG. 1 is a top exploded view of an exemplary embodiment of a submersible foliage planter according to the present invention, in which a container and growing medium of the planter are in a partially assembled state.
Figure 2:
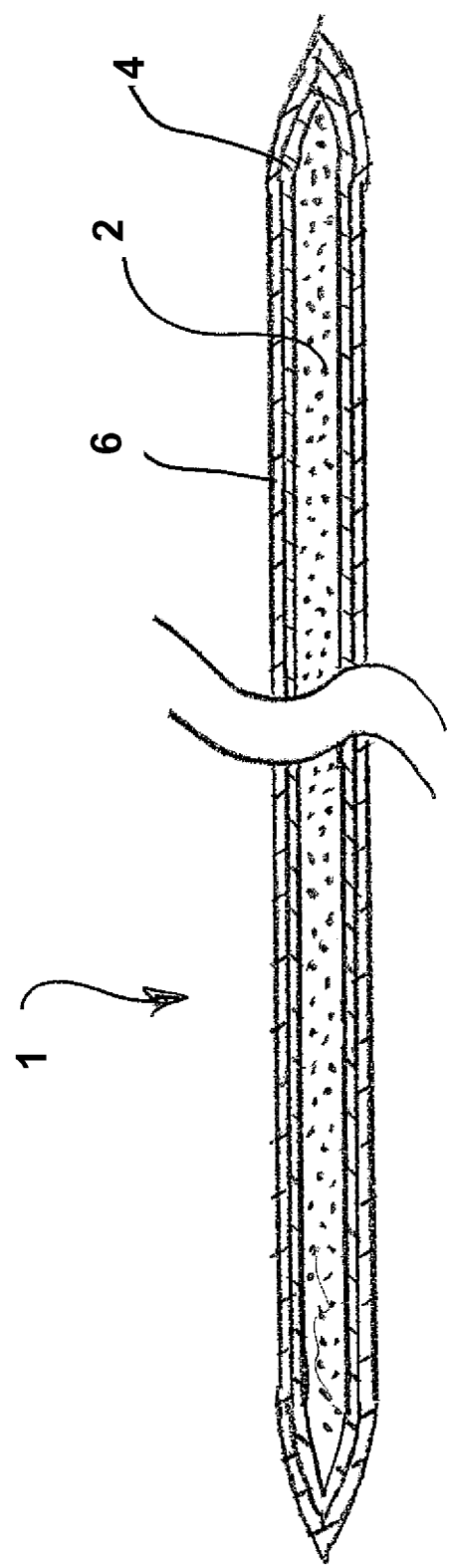
FIG. 2 is an a cross-sectional view of the planter of FIG. 1 after it is fully assembled.

With reference to FIGS. 1-2, there is shown an exemplary embodiment of a submersible foliage planter 1 according to the present invention. FIG. 1 shows the planter 1 in a partially assembled state and FIG. 2 shows a cross-sectional view of the planter 1 after it is fully assembled. The planter 1 generally includes a growing medium 2, an inner pouch 4 of fine porous material which encloses the growing medium 2 therein and an outer pouch 6 of course porous material which encloses the inner pouch 4 therein.

The inner pouch 4 of fine porous material may be formed of one or more layers of a cellulose based material, paper, fine fabric of synthetic or natural material, sheet material with fine openings/pores defined therein, any other appropriate material which can sufficiently contain the growing medium 2 over a long period of time such as one year or more while the planter 1 is disposed in an aquarium filled with water, or combinations of these materials, such that no appreciable amount of the growing medium is released into the aquarium water, e.g., no amount which would cause the aquarium water to become cloudy or which would change the pH of the aquarium water. Further, the fine porous material must be have a characteristic whereby a root system of an aquatic plant may easily penetrate the material as the root system grows. Paper materials such as single or multiple ply, absorbent paper toweling is very suitable for use as the fine porous material because it retains its structural integrity when wet, and a root system of an aquatic plant may easily penetrate the material as the root system grows. However, the claimed invention is not limited thereto as many other materials may also be used suitably as the fine porous material.

The outer pouch 6 of coarse porous material may be formed of one or more layers of screening of fiberglass, plastic or metal, coarse fabric of natural or synthetic material, cheese cloth, any other appropriate coarse porous material, or combinations of these materials. Appropriate materials are highly porous, and will preferably be more resistant to structural degradation when disposed in water and when handled in comparison to the fine porous material used in making the inner pouch 4. The outer pouch 6 encloses the inner pouch 4 therein, and thereby helps to maintain the structural integrity of the inner pouch 4 when the planter 1 is being handled and when it is disposed in an aquarium filled with water over an extended period of time. Screening formed of fiberglass and/or plastic material and with an opening size of 0.5-5 mm is very suitable for use as the coarse porous material because it is highly resistant to structural degradation by water and by handling, and a root system of an aquatic plant may easily penetrate the material as the root system grows. However, the claimed invention is not limited thereto as many other materials may also be used suitably as the coarse porous material.

The porous materials of the inner and outer pouches 4, 6 should be sufficiently durable, or at least the coarse porous material(s) of the outer pouch, so that the planter 1 will be durable and reliably contain the growing medium over a reasonably long period of time, e.g., one or more years, and will permit the planter to be moved within the aquarium after it already has plant(s) rooted therein.

The inner pouch 4 will preferably fully enclose the growing medium 2 therein, and for this purpose may be formed with one open end through which the growing medium may be inserted into the inner pouch, after which the open end may be sealed in any appropriate manner, such as being bonded shut with water-proof adhesive, sewn shut, heat sealed, having an enclosure flap folded over, etc. Similarly, the outer pouch 6 will preferably fully enclose the inner pouch 4 therein, and for this purpose may be formed with one open end through which the inner pouch containing the growing medium may be inserted into the outer pouch, after which the open end may be sealed in any appropriate manner, such as being bonded shut with water-proof adhesive, sewn shut, heat sealed, having an enclosure flap folded over, etc. If desired, only one or the other of the inner and outer pouches may be sealed, and the pouches 4, 6 may be sealed individually or jointly using any appropriate means, such as sewing, bonding with adhesive and/or heat, etc. The planter 1 may be constructed for being reused or for being disposed after a single use. As depicted, the inner pouch 4 may have a shape which corresponds to that of the outer pouch 6, and the inner pouch 4 may have a size which is slightly smaller than that of the outer pouch 6 so that the inner pouch substantially fills the entire space within the outer pouch when the inner pouch containing the growing medium therein is disposed within the outer pouch.

Generally, most people will change the water in their aquariums at least once per year, and a disposable planter 1 would be convenient because it could be disposed of whenever the aquarium water is changed. For being reused, the inner and/or outer pouches 4, 6 could be provided with sealing flaps in conjunction with the open ends thereof, which flaps could simply be folded over to close the open ends and subsequently unfolded when the growing medium is to be replaced. Also, the planter 1 may be constructed such that only the outer pouch 6 is reusable, while the inner pouch 4 is disposed together with the growing medium after each use.

The outer pouch 6 may be similarly shaped to the inner pouch 4 as depicted, but typically the outer pouch will be somewhat larger than the inner pouch to readily accommodate the same therein.

Figure 3:
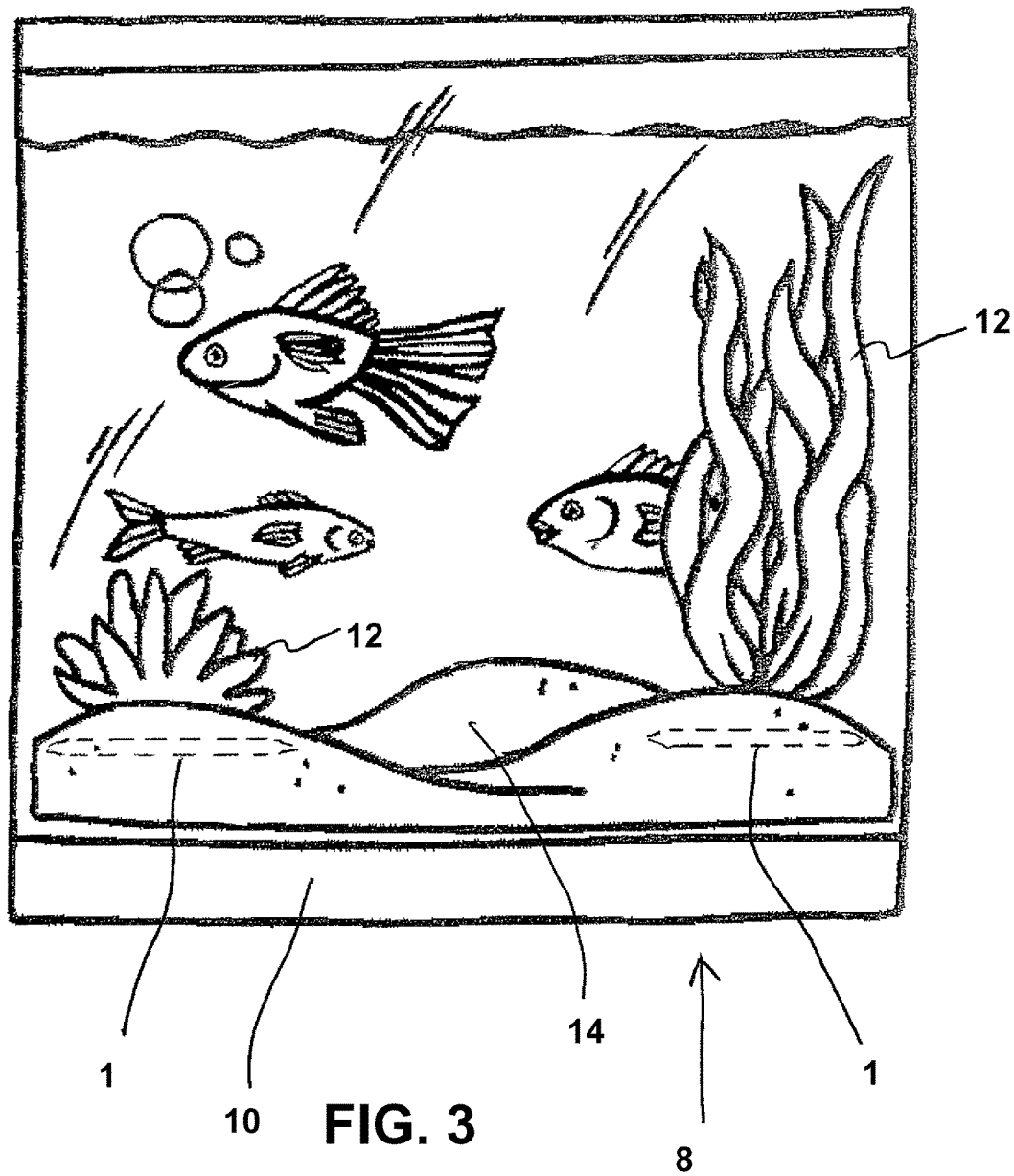
FIG. 3 is a front view of an aquarium having water, fish, and aquatic plants with root systems growing into submersible foliage planters according to the exemplary embodiment of the present invention.

The planter 1 may be any desired size, e.g., from small to large, and may accommodate one or more aquatic plants, but generally will be smaller than the bottom wall/surface 10 of an aquarium 8 in which it is placed, such as shown in FIG. 3. For example, the planter may be 5-25 centimeters in diameter, length, or width in horizontal dimension. Also, when assembled the planter may be substantially flat with a vertical thickness in a range of 0.5-5.0 centimeters. When formed with such a thickness, the planter is easily covered with and fully concealed by sand, gravel, and or other conventional medium used to cover the bottom surface of an aquarium such as shown in FIG. 3, and thereby does not take away from the aesthetic appearance of the aquarium. Of course the size and shape of the planter 1 and the amount of growing medium 2 contained therein may be modified to any given shape, size, or amount as desired by a user.

While the depicted embodiment includes two pouches 4, 6 of fine porous material and coarse material, respectively, a planter according to the present invention may include additional pouches if so desired as long as the additional pouches are consistent with the characteristics of the submersible foliage planter 1 discussed above. Again, the pouches may each be formed of different materials, or there may be multiple layers of the same fine porous material or the same coarse porous material.

The growing medium 2 may be formed of any appropriate material such as soil, compost, cellulose, natural or synthetic fibers, coconut coir, clay aggregate material, silica flakes, tree bark, other natural or synthetic materials suitable for supporting a root system of a plant, etc., or combinations of these, and may be enhanced with fertilizer, e.g., slow-release fertilizer which will be released over the expected long term use of the planter. As the growing medium will be enclosed within the inner and outer pouches 4, 6 and may be heavier/denser than water such that the planter will readily submerge in water and remain on a bottom wall or surface 10 within the aquarium 8 when the aquarium is filled with water. Of course, if the growing medium 2 is not sufficiently heavy/dense then a heavier/denser material may be added thereto to ensure that the planter will readily submerge and stay submerged in an aquarium. Similarly, it is possible to anchor the planter appropriate at a desired location within a planter using a suitable anchoring means (not shown).

Use of a planter according to the present invention is extremely simple and can be easily handled by anyone from novice to someone skilled in the art. Typical use involves placing the planter 1 at a desired location within an aquarium, which may or may not be pre-filled with water, placing an aquatic plant onto the planter such that the plant's root system engages a surface of the planter, and then securing the plant in engagement with the planter using an appropriate amount an appropriate medium 14 such as sand and/or gravel which is place over the plant's root system and will typically entirely cover the planter. Thus disposed, the plant's roots will readily grow through the fine and coarse porous materials of the inner and outer pouches 4, 6 of the planter 1 and into the growing medium 2, after which the plant will thrive when exposed to light.

It is not necessary to form an opening in the inner or outer pouches 4, 6 of the planter 1 in order to insert the root system of the aquatic plant 12 into the growing medium, which makes construction and use of the planter very simple. Of course, an opening could be formed in either or both of the inner and outer pouches 4, 6 for inserting the plant's root system therethrough if so desired, but it is not necessary as such root systems will readily grow through the fine and course porous materials of the pouches. In fact, the plant's root system may grow completely through the planter 1 over time such that ends of the root system are disposed between the bottom of the planter 1 and the bottom wall/surface 10 of the aquarium. This will not adversely affect the plant's growth, as the root system will still derive sufficient nutrients from the growing medium 2 via those portions of the root system disposed within the growing medium. As a modification to the planter 1 according to the present invention a layer of material which is impervious to the plant's root system could be provided on the bottom and/or sides of the planter so as to prevent the root system from growing completely through the planter 1. However, this is not necessary, and may inhibit the plant's growth to any extent that it becomes root-bound in the planter.

With the planter 1 according to the invention the growing medium 2 is desirably contained within the container such that it will not significantly affect the appearance (cloudiness), pH, and other characteristics of the water in the aquarium. This is desirable not only for esthetic appearance of the aquarium, but also because some fish are highly sensitive to pH, and may be injured or killed by any significant pH change which results from soil or other growing medium placed in the aquarium. Also, the planter 1 having the inner and outer pouches 4, 6 has a sufficient structural integrity that it may be easily handled without fear of tearing an opening therein, and may be placed in the aquarium even while water and fish are present.

The present invention is not limited in its application to the details of construction and to the dispositions of the components set forth in the foregoing description or illustrated in the appended drawings in association with the present exemplary embodiment of the invention. The present invention is capable of other embodiments and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions Although the present invention has been described herein with respect to a specific illustrative embodiment, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A submersible foliage planter for use in planting an aquatic plant to grow submerged under water in an aquarium, the foliage planter comprising:
   a growing medium; and
   a container including an inner pouch of fine porous material which fully encloses the growing medium therein and an outer pouch of course porous material which encloses the inner pouch therein, wherein
   the coarse porous material of the outer pouch has an average pore size larger than that of the fine porous material of the inner pouch,
   each of the fine porous material and course porous material is water permeable and is configured to be permeated by a root system of the aquatic plant when the foliage planter and the aquatic plant are submerged in water and the aquatic plant root system is disposed in engagement with the outer pouch and permitted to grow,
   the growing medium is configured to receive and support the aquatic plant root system for growth of the root system in the growing medium when the aquatic plant root system grows and permeates through the fine porous material and course porous material of the inner and outer pouches into the growing medium, the fine porous material of the inner pouch comprises cellulose, the coarse porous material of the outer pouch is more resistant to structural degradation when disposed in water and when handled in comparison to the fine porous material of the inner pouch, and the course porous material of the outer pouch comprises plastic and is water insoluble, and the growing medium has an average particle size larger than a pore size of the fine porous material.

2. The submersible foliage planter of claim 1, wherein the submersible foliage planter is substantially flat with a thickness in a range of 0.5-5.0 centimeters and is configured such that when the aquatic plant root system is engaged with an upper surface of the outer pouch while submerged under water the root system will grow downwardly and permeate through the course porous material and fine porous material of the outer and inner pouches into the growing medium.

3. The submersible foliage planter of claim 1, wherein at least one of the inner and outer pouches is sealed shut by bonding with an adhesive, by heat sealing, or by being sewn shut.

4. The submersible foliage planter of claim 1, wherein the inner pouch is formed of paper and the plastic, coarse porous material of the outer pouch is at least one of a plastic foraminous fabric and a plastic screen material.

5. The submersible foliage planter of claim 1, wherein the inner pouch is formed of one or more layers of a water-absorbent paper material and the plastic, course porous material of the outer pouch is at least one of a plastic screen material of fiberglass and a plastic material with a pore opening size of 0.5-5 mm.

6. The submersible foliage planter of claim 1, wherein the plastic, coarse porous material of the outer pouch is at least one of a plastic foraminous fabric and a plastic screen material.

7. The submersible foliage planter of claim 1, wherein the inner pouch has a shape which corresponds to that of the outer pouch, and the inner pouch has a size which is slightly smaller than that of the outer pouch so that the inner pouch substantially fills an entire space within the outer pouch when the inner pouch containing the growing medium therein is disposed within the outer pouch.

8. The submersible foliage planter of claim 1, wherein the inner pouch is formed of paper and the plastic, coarse porous material of the outer pouch is a plastic screen material.

9. A method of planting an aquatic plant for growth submerged in water, comprising the steps of:
   a) installing the submersible foliage planter of claim 1 in an aquatic tank;
   b) placing the aquatic plant such that a root system of the aquatic plant is disposed in engagement with the submersible foliage planter;
   c) covering the root system of the aquatic plant and at least partially covering the submersible foliage planter with a water-insoluble medium; and
   d) adding water to the tank to a level which covers the submersible foliage planter and the aquatic plant.

10. The method according to claim 9, wherein the water-insoluble medium includes at least one of sand and gravel.

* * * * *